(12) United States Patent
Qiu et al.

(10) Patent No.: US 11,969,025 B2
(45) Date of Patent: Apr. 30, 2024

(54) ELECTRONIC CIGARETTE CHARGING DEVICE AND ELECTRONIC CIGARETTE SYSTEM

(71) Applicant: CHANGZHOU PATENT ELECTRONIC TECHNOLOGY CO., LTD, Changzhou (CN)

(72) Inventors: Weihua Qiu, Jiangsu (CN); Xiaoqi Xu, Jiangsu (CN)

(73) Assignee: CHANGZHOU PATENT ELECTRONIC TECHNOLOGY CO., LTD, Changzhou (CN)

( * ) Notice: Subject to any disclaimer, the term of this patent is extended or adjusted under 35 U.S.C. 154(b) by 678 days.

(21) Appl. No.: 17/200,734

(22) Filed: Mar. 12, 2021

(65) Prior Publication Data

US 2021/0227893 A1 Jul. 29, 2021

Related U.S. Application Data

(63) Continuation of application No. PCT/CN2019/104761, filed on Sep. 6, 2019.

(30) Foreign Application Priority Data

Sep. 17, 2018 (CN) .......................... 201821520008.0

(51) Int. Cl.
*A24F 40/90* (2020.01)
*A24F 40/85* (2020.01)
*H02J 7/00* (2006.01)

(52) U.S. Cl.
CPC .............. *A24F 40/90* (2020.01); *A24F 40/85* (2020.01); *H02J 7/0044* (2013.01)

(58) Field of Classification Search
CPC .......... A24F 40/90; A24F 40/85; A24F 40/95; A24F 40/20; H02J 7/0044
See application file for complete search history.

(56) References Cited

U.S. PATENT DOCUMENTS

| 9,883,700 B2 * | 2/2018 | Holzherr | .................. A24F 9/16 |
| 2004/0129297 A1 | 7/2004 | Settlemyer | |
| 2018/0198297 A1 * | 7/2018 | Grzan | .................. H02J 7/0042 |

FOREIGN PATENT DOCUMENTS

| CN | 204146335 A | 2/2015 |
| CN | 207023256 U | 2/2018 |

(Continued)

OTHER PUBLICATIONS

The extended European search report of EP application No. 19862855.4 dated May 31, 2022.

*Primary Examiner* — Tho D Ta
(74) *Attorney, Agent, or Firm* — Andrew C. Cheng

(57) ABSTRACT

A charging device for an electronic cigarette system is provided. The electronic cigarette system includes a smoking device. The smoking device includes a heating member. The charging device includes a housing and a cleaning device located in the housing. The housing is provided with a hollow chamber configured for receiving the smoking device and an accommodation cavity configured for installing the cleaning device. The accommodation cavity is in communication with the hollow chamber. When the smoking device is placed into the hollow chamber, the cleaning device in the accommodation cavity is configured to contact with the heating member of the smoking device and clean the heating member. The charging device is convenient for the user to carry the cleaning device and clean the heating member.

20 Claims, 4 Drawing Sheets

(56) References Cited

FOREIGN PATENT DOCUMENTS

| CN | 207479044 A | 6/2018 |
| CN | 208941052 U | 6/2019 |
| EP | 2201850 A1 | 6/2010 |
| EP | 3136887 A1 | 3/2017 |

* cited by examiner

ELECTRONIC CIGARETTE CHARGING DEVICE AND ELECTRONIC CIGARETTE SYSTEM

CROSS-REFERENCE TO RELATED APPLICATIONS

This application is a continuation-in-part of International Patent Application No. PCT/CN2019/104761, filed on Sep. 6, 2019, entitled "electronic cigarette charging device and electronic cigarette system", which claims priority to Chinese Patent Application No. 201821520008.0, filed on Sep. 17, 2018. The aforementioned patent applications are hereby incorporated by reference in their entireties.

TECHNICAL FIELD

The present disclosure relates to the technical field of simulated smoking, and more particularly, relates to an electronic cigarette charging device and an electronic cigarette system using the electronic cigarette charging device.

BACKGROUND

Electronic cigarettes, also known as virtual cigarettes, electronic atomizers, and electronic cigars, have the same appearance as cigarettes and a similar taste to cigarettes. They are mainly used to simulate the feeling of smoking for smoking cessation or alternative use of cigarettes. Generally, after the heating member heats the tobacco product, as time goes by, residual dirt will be formed on the surface of the heating member. If the residual dirt is not cleaned in time, the performance of the heating member will be impaired.

Generally, the tobacco product and the cleaning member are packed in one box, and the user can use the cleaning member to clean the tobacco product. After the cleaning device is used, the foil seal for preventing volatilization of the cleaning solvent in the cleaning member becomes failure. If the cleaning device is stored together with the tobacco product, the cleaning solvent volatilized after the break of the seal of the cleaning member will contaminate the tobacco product. If the user carries the cleaning member with him, it is often inconvenient for the user to carry too many things.

SUMMARY

In view of the above problem, it is necessary to provide an electronic cigarette charging device and an electronic cigarette system that are convenient for users to carry the cleaning device for cleaning the heating member.

A charging device for an electronic cigarette system is provided. The electronic cigarette system includes a smoking device. The smoking device includes a heating member. The charging device includes a housing and a cleaning device located in the housing. The housing is provided with a hollow chamber configured for receiving the smoking device and an accommodation cavity configured for installing the cleaning device. The accommodation cavity is in communication with the hollow chamber. When the smoking device is placed into the hollow chamber, the cleaning device in the accommodation cavity is configured to contact with the heating member of the smoking device and clean the heating member.

In one embodiment, the charging device further includes a locking structure mounted to the housing. The locking structure includes two locking members disposed adjacent to the accommodation cavity and rotatably connected to the housing. The two locking members are configured to lock the cleaning device in the accommodation cavity to prevent the cleaning device from slipping out of the accommodation cavity.

In one embodiment, each locking member includes a manipulation portion and a locking portion provided at one end of the manipulation portion. Each locking portion is provided with a rotating hole extending through the bottom of the housing. Each rotating hole is provided with a rotating shaft.

In one embodiment, the charging device further includes a flip structure disposed adjacent to the locking structure and movably connected to the housing. The locking structure is exposed or covered through operating the flip structure by a user.

In one embodiment, the housing defines a shaft hole. The flip structure includes a rotating shaft corresponding to the shaft hole and a cover plate rotatably connected to the housing through the rotating shaft. Two side walls of the cover plate are provided with two limiting holes corresponding to two ends of the shaft hole.

In one embodiment, the cover plate is further provided with a limiting groove configured for resisting the bottom of the cleaning device.

In one embodiment, the charging device further includes a power supply device located in the housing to supply power to the charging device. The power supply device includes a first controller, a first battery, and first electrode contacts located in the hollow chamber. The first battery and the first electrode contacts are electrically connected to the first controller.

An electronic cigarette system includes a smoking device and a charging device as mentioned above.

In one embodiment, the smoking device includes an outer casing, and a second battery, a second controller and a heating member located in the outer casing. The outer casing defines a receiving cavity configured for placing a tobacco product. The heating member is located in the receiving cavity. The heating member and the second battery are electrically connected to the second controller.

In one embodiment, the smoking device further includes second electrode contacts provided in the receiving cavity, and the second electrode contacts are connected to the second battery.

In the charging device or the electronic cigarette system provided by the present disclosure, since the housing is separately provided with a hollow chamber for placing the smoking device and an accommodation cavity for installing the cleaning device, and the accommodation cavity is in communication with the hollow chamber, when the smoking device is placed in the hollow chamber, the cleaning device in the accommodation cavity can contact with the heating member of the smoking device and clean the heating member. Thus, the charging device or the electronic cigarette system using the charging device is convenient for the user to carry the cleaning device and clean the heating member.

BRIEF DESCRIPTION OF THE DRAWINGS

Exemplary embodiments of the disclosure are described more fully hereinafter with reference to the accompanying drawings.

Figure 1:
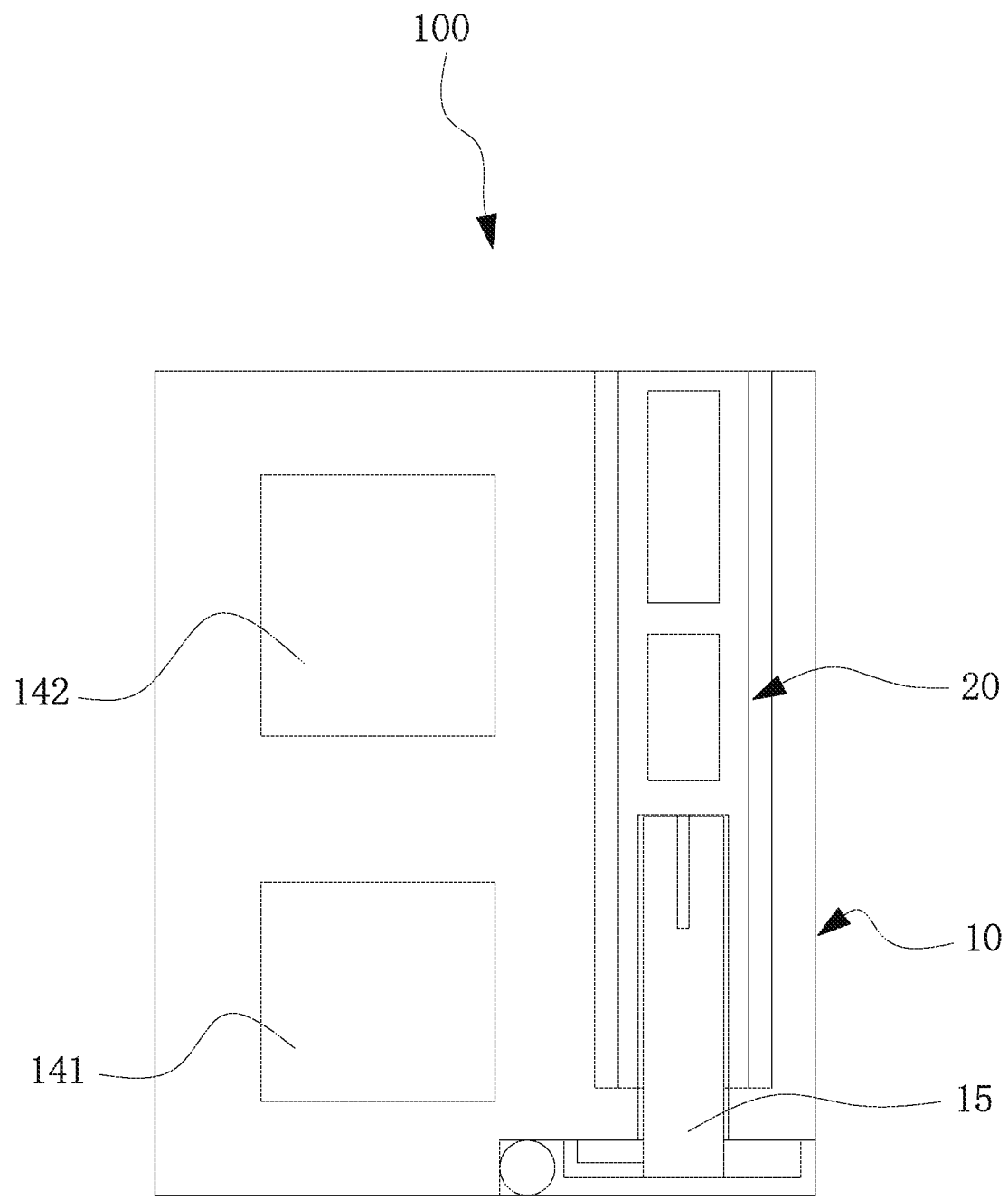
FIG. 1 is a schematic diagram of the internal structure of the electronic cigarette system of the present disclosure.
Figure 2:
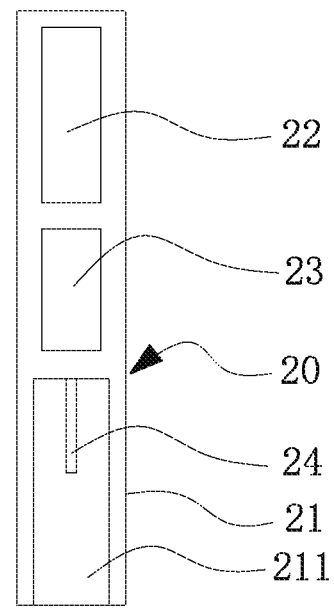
FIG. 2 is a partially exploded view of the electronic cigarette system shown in FIG. 1.
Figure 2:
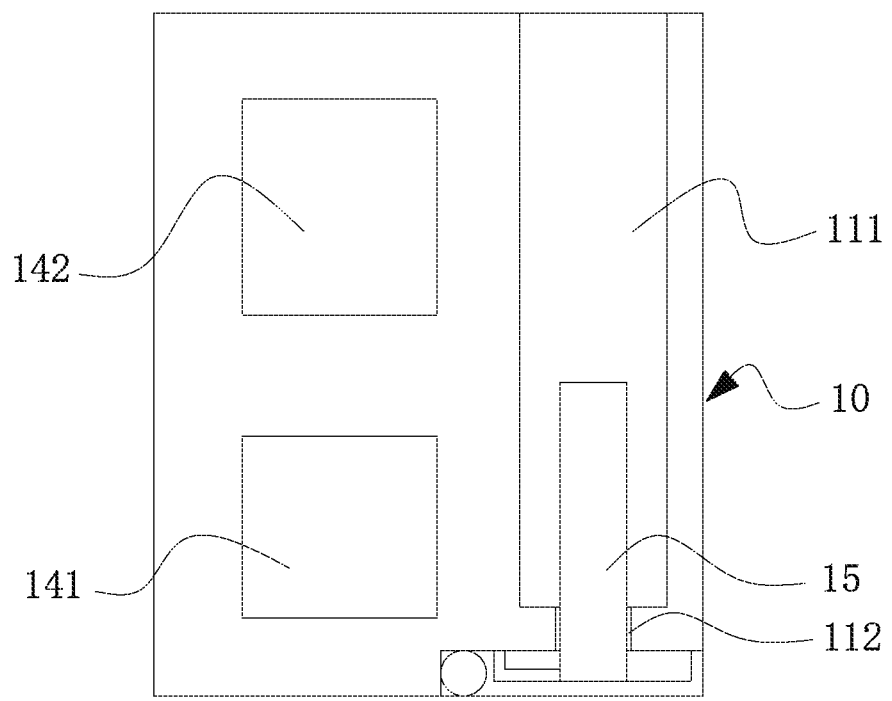
Figure 3:
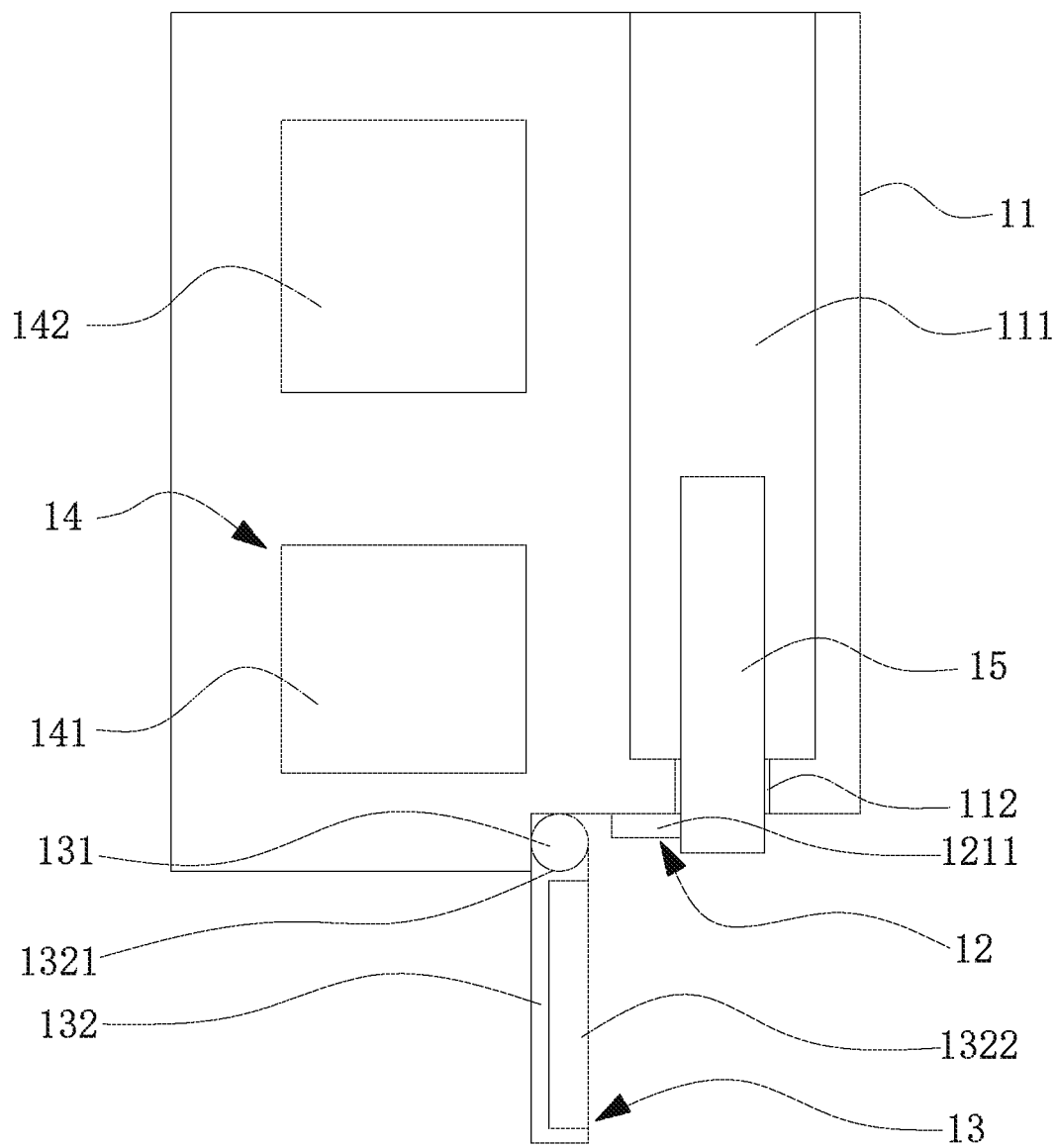
FIG. 3 is a schematic diagram of the cooperation relationship between the charging device and the cleaning device in the electronic cigarette system shown in FIG. 2 in one state.
Figure 4:
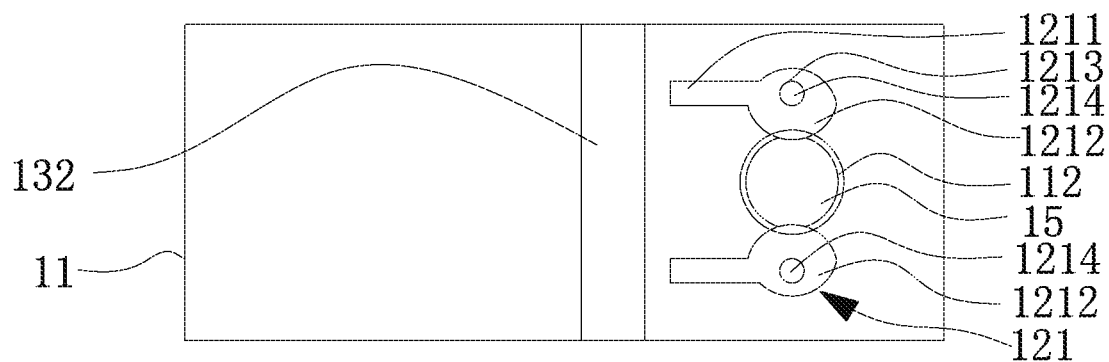
FIG. 4 is a bottom view of the charging device shown in FIG. 3.
Figure 5:
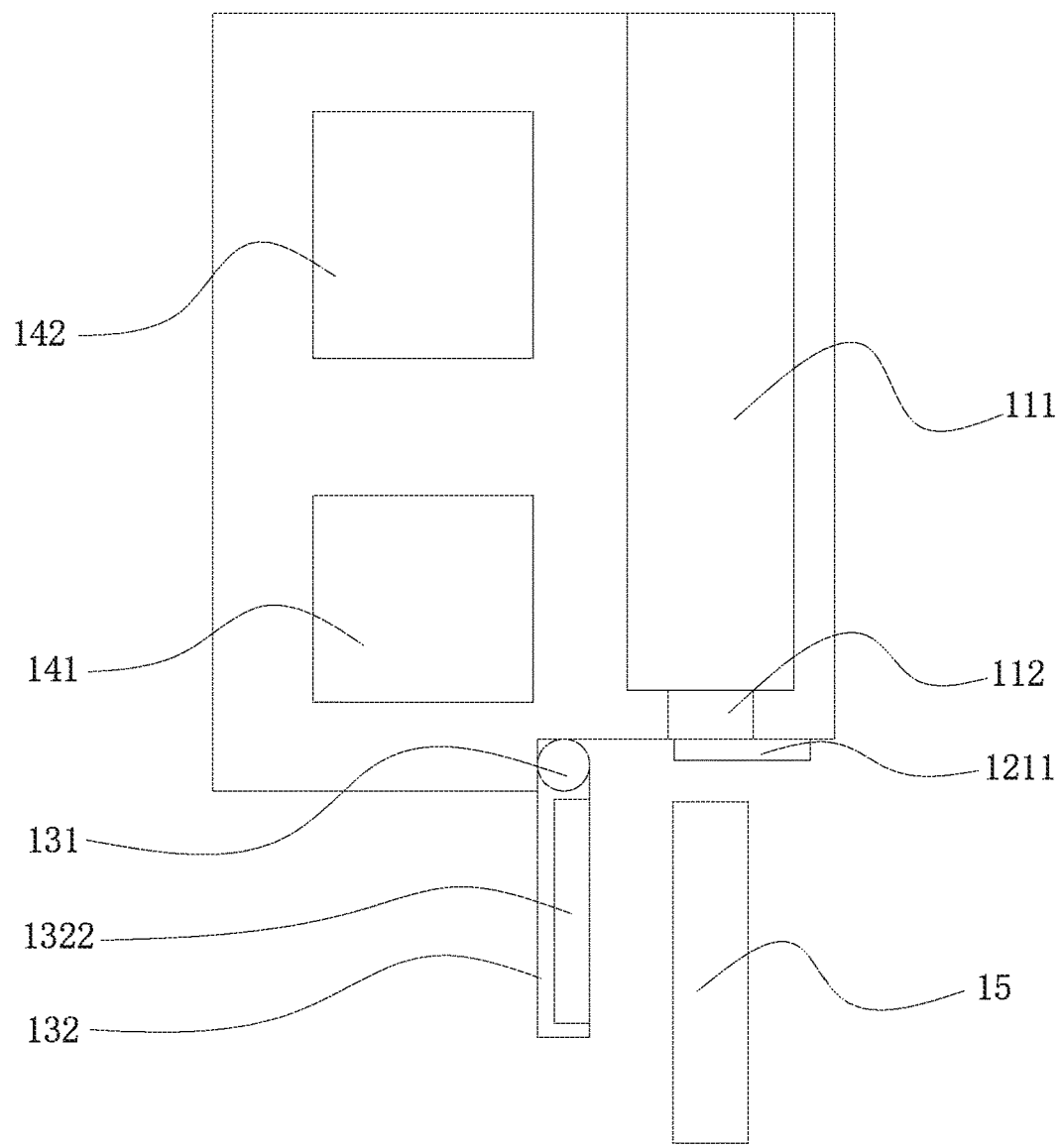
FIG. 5 is a schematic diagram of the cooperation relationship between the charging device and the cleaning device of the electronic cigarette system shown in FIG. 2 in another state.
Figure 6:
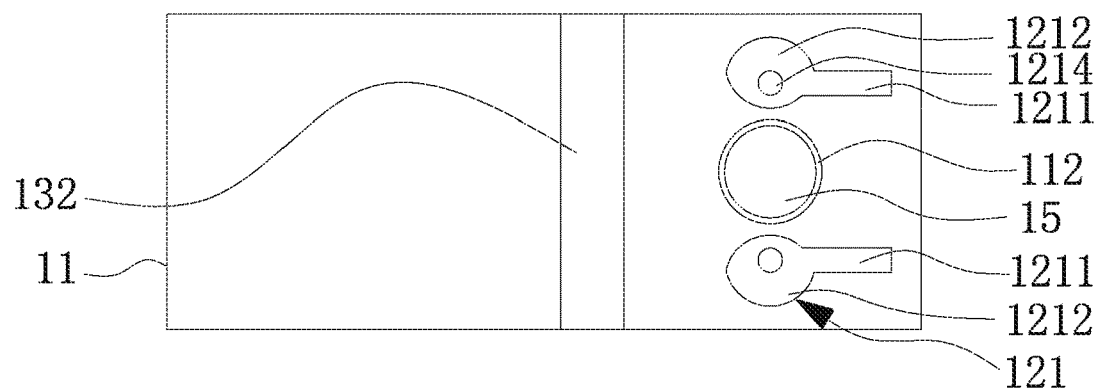
FIG. 6 is a bottom view of the charging device shown in FIG. 5.

The reference numerals for various components in the drawings are as follow:

| | |
|---|---|
| Electronic cigarette system 100 | Charging device 10 |
| Smoking device 20 | Housing 11 |
| Locking structure 12 | Flip structure 13 |
| Hollow chamber 111 | Accommodation cavity 112 |
| Rotating shaft 131 | Cover plate 132 |
| Limiting hole 1321 | Limiting groove 1322 |
| Locking member 121 | Manipulation portion 1211 |
| Locking portion 1212 | Rotating hole 1213 |
| Rotating shaft 1214 | Power supply device 14 |
| First controller 141 | First battery 142 |
| Outer casing 21 | Second battery 22 |
| Second controller 23 | Receiving cavity 211 |
| Heating member 24 | Cleaning device 15 |

DETAILED DESCRIPTION OF PREFERRED EMBODIMENTS

In order to make the objects, features, and advantages of the present disclosure more apparently, embodiments of the present disclosure will now be described in more detail with reference to the accompanying drawings. Numerous specific details are set forth in order to provide a thorough understanding of the embodiments described herein. However, it will be understood by those of ordinary skill in the art that the embodiments described herein can be practiced without these specific details. The description is not to be considered as limiting the scope of the embodiments described herein.

It should be noted that when an element is referred to as being "fixed to" another element, it may be directly on the other element or there may be a centered element. When an element is considered to be "connected" to another element, it can be directly connected to the other element or intervening elements may also be present.

Unless defined otherwise, all technical and scientific terms used herein have the same meaning as commonly understood by one of ordinary skill in the art to which this disclosure belongs. The terms used herein in the description of the present disclosure are only for the purpose of describing specific embodiments, and are not intended to limit the present disclosure. The term "and/or" as used herein includes any and all combinations of one or more of the associated listed items.

Referring to FIG. 1, the present discourse provides an electronic cigarette system 100, the electronic cigarette system 100 includes a charging device 10 and a smoking device 20 detachably assembled in the charging device 10. The smoking device 20 is electrically connected to the charging device 10. The charging device 10 is used to charge the smoking device 20, the smoking device 20 is used to atomize the tobacco product (not shown).

Please refer to FIGS. 2-6 at the same time, the charging device 10 includes a housing 11 and a cleaning device 15 located in the housing 11.

The top of the housing 11 is provided with a hollow chamber 111 for receiving the smoking device 20, the bottom of the housing 11 is provided with an accommodation cavity 112 in communication with the hollow chamber 111, and the accommodation cavity 112 is used for accommodating the cleaning device 15. The bottom of the housing 11 further defines a shaft hole (not shown) at one side of the accommodation cavity 112.

The cleaning device 15 includes a contact member (not shown), and the contact member can remove carbonized deposits and dirt when it is in contact with the smoking device 20. Optionally, in one embodiment, the contact member includes a storage structure and cleaning consumables contained in the storage structure. The storage structure can be made of materials that are easy to store liquids, such as sponge, glass fiber, porous ceramic, foam metal, etc.; correspondingly, the cleaning consumables can be selected from glycerin, 1-diethoxypropane, isopropyl ether, methyl isoacetone, methyl tetrahydrofuran, petroleum ether and other materials with low toxicity or non-toxicity and good dissolving effect for carbonized deposits and dirt. Optionally, in another embodiment, the contact member can be made into a shape like brush, spatula, blade, etc., which facilitates physical cleaning of carbonized deposits and dirt. The contact member can be made of plastic, metal, ceramic material.

Please refer to FIGS. 4 and 6 again, the charging device 10 further includes a locking structure 12 provided at the housing 11 to prevent the cleaning device 15 from slipping off. The locking structure 12 includes two locking members 121 provided at the bottom of the housing 11 and arranged on both sides of the accommodation cavity 112. Each locking member 121 is rotatably connected to the housing 11, so that the cleaning device 15 can be locked under the cooperation of the two locking members 121. Each locking member 121 includes a manipulation portion 1211 and a locking portion 1212 provided at one end of the manipulation portion 1211, each locking portion 1212 is provided with a rotating hole 1213 extending through the bottom of the housing 11, and each rotating hole 1213 is provided with a rotating shaft 1214. The user can rotate the manipulating portion 1211 to drive the locking portion 1212 to rotate around the rotating shaft 1214 relative to the housing 11. In this embodiment, the locking portion 1212 is a cam. When the cleaning device 15 is mounted in the accommodation cavity 112, the user can rotate the two locking members 121 at the same time, so that the locking portion 1212 of each locking member 121 rotates to one side relative to the housing 11, and the two locking members 121 respectively exert a resisting force on both sides of the bottom of the cleaning device 15, to clamp the two sides of the bottom of the cleaning device 15 under the cooperation of the two locking members 121 to prevent the cleaning device 15 from slipping out of the accommodation cavity 112. When the cleaning device 15 needs to be taken out, the user can rotate one of the locking members 121 or the two locking members 121 at the same time, so that the locking portion 1212 of the locking member 121 rotates to the other side relative to the housing 11, thus the resisting force exerted by the locking member 121 on the bottom of the cleaning device 15 is released, and the user can take out the cleaning device 15 from the accommodation cavity 112. It can be understood that, in other embodiments, the locking structure 12 can also be movably mounted on the housing 11 by means of snap connection, plug connection, etc., thus the user can adjust the locking structure 12 by pushing or other methods to lock the cleaning device 15 by the locking structure 12. It can be understood that, in other embodiments not shown, the locking structure 12 can also be omitted. When the locking structure 12 is omitted, the cleaning device 15 can be directly connected to the inner wall of the accommodation cavity 112 to install the cleaning device 15 in the accommodation cavity 112. For example, the cleaning device 15 is threadedly connected to the inner wall of the accommodation cavity 112, the bottom of the inner wall of the accommodation cavity 112 is provided with an internal thread section, and one end of the cleaning device 15 is provided with an external thread section corresponding to the internal thread section. It can be understood that, one end of the cleaning device 15 can also be movably mounted to the inner wall of the accommodation cavity 112 by means of snapping, plugging, or the like.

The charging device further includes a flip structure 13 disposed adjacent to the locking structure 12, and the flip structure 13 is movably connected to the housing 11 to expose or cover the locking structure 12. The flip structure 13 includes a rotating shaft 131 corresponding to the shaft hole and a cover plate 132 rotatably connected to the housing 11 through the rotating shaft 131. The cover plate 132 is movably located at the bottom of the two locking members 121, and the cover plate 132 is rotatably connected to the bottom of the housing 11 to expose or cover the cleaning device 15. Two side walls of the cover plate 132 are provided with two limiting holes 1321 corresponding to two ends of the shaft hole. During installation, the two limiting holes 1321 are aligned with the shaft hole, so that one end of the rotating shaft 131 can extend through one of the limiting holes 1321 and the shaft hole in sequence, and then insert into the other limiting hole 1321. Or, firstly, the rotating shaft 131 is inserted into the shaft hole, then one end of the rotating shaft 131 is inserted into one of the limiting holes 1321, and thereafter, by adjusting the displacement of the rotating shaft 131 in the shaft hole, the other end of the rotating shaft 131 is inserted into the other limiting hole 1321. It can be understood that, in other embodiments, the cover plate 132 can also be movably connected to the housing 11 by means of snap connection, plug connection, hinge connection, magnetic connection, etc., and the user can adjust the cover plate 132 by pushing, rotating or other methods to expose the accommodation cavity 112, so long as it is convenient for the user to take out the cleaning device 15 located in the accommodation cavity 112. In this embodiment, the cover plate 132 is further provided with a limiting groove 1322, when the cover plate 132 covers the accommodation cavity 112, the bottom wall of the limiting groove 1322 resists the bottom of the cleaning device 15. It can be understood that, in other embodiments not shown, the limiting groove 1322 can be omitted, when the limiting groove 1322 is omitted and the cover plate 132 closes the accommodation cavity 112, the top surface of the cover plate 132 directly abuts against the lower end surface of the cleaning device 15.

In this embodiment, the flip structure 13 is used to cover the locking structure 12 and the accommodation cavity 112, thereby protecting the locking structure, preventing the cleaning device 15 located in the accommodation cavity 112 from being polluted, and improving the appearance consistency of the charging device 10. It can be understood that, in other embodiments, the flip structure 13 may be omitted.

The charging device 10 further includes a power supply device 14 located in the housing 11 to supply power to the charging device 10. The power supply device 14 includes a first controller 141, a first battery 142, and first electrode contacts (not shown) arranged at the bottom of the hollow chamber 111. Both the first battery 142 and the first electrode contacts are electrically connected to the first controller 141. It can be understood that, in other embodiments not shown, the position of the first electrode contacts may be arranged at the side wall of the hollow chamber 111, which is not limited.

It can be understood that, in other embodiments not shown, a USB (Universal Serial Bus) interface (not shown) and at least one indicator (not shown) are provided at the side wall of the housing 11. Both the USB interface and the indicator are connected to the first controller 141. The first controller 141 is used to control the indicators to remind the user, and the first controller 141 is also used to read, write, store, and modify the USB flash disk or the card reader that is inserted into the USB interface. One of the indicators can be used to remind the user that the smoking device 20 has been fully charged; one of the indicators can be used to remind the user that the smoking device 20 is not completely inserted into the hollow chamber 111; and one of the indicators can be used to remind the user that the position of the smoking device 20 is displaced when it is inserted into the hollow chamber 111. It can be understood that, the function and the number of the indicators are not limited, they can be set according to the control requirements of the charging device 10. The way of reminding the user includes that the first controller 141 controls multiple indicators to flash, buzz, vibrate, and so on.

Please refer to FIG. 2 again, the smoking device 20 includes an outer casing 21, a second battery 22 located in the outer casing 21, a second controller 23 and a heating member 24. One end of the outer casing 21 away from the second controller 23 is opened and forms a receiving cavity 211 for placing the tobacco product. The heating member 24 is located in the receiving cavity 211. The second controller 23 is connected to the second battery 22. The smoking device 20 further includes a heating member 24 arranged in the receiving cavity 211 and connected to the second controller 23, and second electrode contacts (not shown) provided at the bottom of the receiving cavity 211 corresponding to the first electrode contacts, respectively. The second electrode contacts are connected to the second battery 22. It can be understood that the tobacco product includes a filter part (not shown) and an aerosol-forming substrate (not shown) at one end of the filter part. In the embodiment, the filter part is made of cellulose acetate or polypropylene, and the aerosol-forming substrate is shredded tobacco. It can be understood that, in other embodiments, the aerosol-forming substrate may also be other tobacco product such as tobacco paste and tobacco pad. In use, the tobacco product is placed in the receiving cavity 211, the tobacco product contacts with the heating member 24, and the heating member 24 heats the aerosol-forming substrate to form smoke.

Installation process: the flip structure 13 is assembled to the housing 11, during assembling, the two limiting holes 1321 are aligned with the shaft hole, so that one end of the rotating shaft 131 extends through one of the limiting holes 1321 and the shaft hole in sequence, and then extends into the other limiting hole 1321; Or, firstly, the rotating shaft 131 is inserted into the shaft hole, then one end of the rotating shaft 131 is inserted into one of the limiting holes 1321, and thereafter, by adjusting the displacement of the rotating shaft 131 in the shaft hole, the other end of the rotating shaft 131 is inserted into the other limiting hole 1321, so that the cover plate 132 is rotatably connected with the bottom of the housing 11; the cleaning device 15 is installed in the accommodation cavity 112 and the cleaning device 15 extends into the hollow chamber 111; then, the user rotates the two locking members 121 at the same time, so that the locking portion 1212 of each locking member 121 rotates to one side relative to the housing 11, and the two locking members 121 respectively exert a resisting force on both sides of the bottom of the cleaning device 15, to clamp the two sides of the bottom of the cleaning device 15 under the cooperation of the two locking members 121 to prevent the cleaning device 15 from slipping out of the accommodation cavity 112; then, the cover plate 132 is rotated to cover the bottom of the two locking members 121 to shield the accommodation cavity 112.

In use: when the user needs to smoke the electronic cigarette system 100, the tobacco product is placed onto the heating member 24 located in the receiving cavity 211, the heating member 24 heats the tobacco product to form smoke. Optionally, when the user needs to charge the smoking device 20, the smoking device 20 is placed into the hollow chamber 111, thus the second electrode contacts are respectively in contact with the first electrode contacts, so that the charging device 10 charges the smoking device 20. Preferably, the cleaning device 15 is installed in the accommodation cavity 112 and extends into the hollow chamber 111; the user rotates the two locking members 121 at the same time, so that the locking portion 1212 of each locking member 121 rotates to one side with respect to the housing 11, and the two locking members 121 respectively exert a pressure on both sides of the bottom of the cleaning device 15, to clamp the two sides of the bottom of the cleaning device 15 under the cooperation of the two locking members 121 to prevent the cleaning device 15 from slipping out of the accommodation cavity 112. The cover plate 132 is then rotated to cover the bottom of the two locking members 121, thereby shielding the cleaning device 15. At this time, the cover plate 132 is used to protect the two locking members 121, prevent the cleaning device 15 from being polluted, and improve the appearance consistency of the cigarette charging device 10. When the smoking device 20 is placed in the hollow chamber 111, the heating member 24 is inserted into the cleaning device 15. Since the contact member of the cleaning device contacts the heating member 24, the contact member can clean the dirt on the heating member 24, which improves the user experience.

In the charging device 10 provided by the present disclosure, since the housing 11 is separately provided with a hollow chamber 111 for placing the smoking device 20 and an accommodation cavity 112 for installing the cleaning device 15, and the accommodation cavity 112 is in communication with the hollow chamber 111, when the smoking device 20 is placed in the hollow chamber 111, the cleaning device 15 in the accommodation cavity 112 can contact with the heating member 24 of the smoking device 20 and clean the heating member 24. The charging device 10 or the electronic cigarette system 100 using the charging device 10 is convenient for the user to carry the cleaning device 15 and clean the heating member 24.

The above-mentioned embodiments merely represent several implementations of the present application, and the descriptions thereof are more specific and detailed, but they shall not be understood as a limitation on the scope of the present application. It should be noted that, for those of ordinary skill in the art, variations and improvements may still be made without departing from the concept of the present application, and all of which shall fall into the protection scope of the present application. Therefore, the scope of protection of the present application shall be subject to the appended claims.

What is claimed is:

1. A charging device for an electronic cigarette system, the electronic cigarette system comprising a smoking device, the smoking device comprising a heating member, wherein the charging device comprises a housing and a cleaning device located in the housing, the housing is provided with a hollow chamber configured for receiving the smoking device and an accommodation cavity configured for installing the cleaning device, the accommodation cavity is in communication with the hollow chamber, when the smoking device is placed into the hollow chamber for being charged by the charging device, the cleaning device in the accommodation cavity is configured to contact with the heating member of the smoking device and clean the heating member.

2. The charging device according to claim 1, wherein the charging device further comprises a locking structure mounted to the housing, the locking structure comprises two locking members disposed adjacent to the accommodation cavity and rotatably connected to the housing, the two locking members are configured to lock the cleaning device in the accommodation cavity to prevent the cleaning device from slipping out of the accommodation cavity.

3. The charging device according to claim 2, wherein each locking member comprises a manipulation portion and a locking portion provided at one end of the manipulation portion, each locking portion is provided with a rotating hole extending through the bottom of the housing, each rotating hole is provided with a rotating shaft.

4. The charging device according to claim 2, wherein the charging device further comprises a flip structure disposed adjacent to the locking structure and movably connected to the housing, the locking structure is exposed or covered through operating the flip structure by a user.

5. The charging device according to claim 4, wherein the housing defines a shaft hole, the flip structure comprises a rotating shaft corresponding to the shaft hole and a cover plate rotatably connected to the housing through the rotating shaft, two side walls of the cover plate are provided with two limiting holes corresponding to two ends of the shaft hole.

6. The charging device according to claim 5, wherein the cover plate is further provided with a limiting groove configured for resisting the bottom of the cleaning device.

7. The charging device according to claim 1, wherein the charging device further comprises a power supply device located in the housing to supply power to the charging device, the power supply device comprises a first controller, a first battery, and first electrode contacts located in the hollow chamber, the first battery and the first electrode contacts are electrically connected to the first controller.

8. An electronic cigarette system comprising a smoking device and a charging device according to claim 1.

9. The electronic cigarette system according to claim 8, wherein the smoking device comprises an outer casing, and a second battery, a second controller and a heating member located in the outer casing, the outer casing defines a receiving cavity configured for placing a tobacco product, the heating member is located in the receiving cavity, the heating member and the second battery are electrically connected to the second controller.

10. The electronic cigarette system according to claim 9, wherein the smoking device further comprises second electrode contacts provided in the receiving cavity, the second electrode contacts are connected to the second battery.

11. An electronic cigarette system comprising:
a smoking device comprising a heating member; and
a charging device comprising a housing and a cleaning device located in the housing;
wherein the housing is provided with a hollow chamber and an accommodation cavity in communication with the hollow chamber, the hollow chamber is configured for receiving the smoking device therein when the smoking device is required to be charged by the charging device, the accommodation cavity is configured for the cleaning device to be installed therein, when the smoking device is placed into the hollow chamber for being charged by the charging device, the cleaning device is in contact with the heating member to clean the heating member.

12. The electronic cigarette system according to claim 11, wherein the charging device further comprises a locking structure mounted to the bottom of the housing, the locking structure comprises a locking member disposed adjacent to the accommodation cavity, the locking member is configured to lock the cleaning device in the accommodation cavity to prevent the cleaning device from slipping out of the accommodation cavity.

13. The electronic cigarette system according to claim 12, wherein the locking structure is provided with two locking members, and the two locking members are disposed at two opposite sides of the accommodation cavity, the two locking members are configured to exert a resisting force on both sides of the bottom of the cleaning device to clamp the bottom of the cleaning device under the cooperation of the two locking members.

14. The electronic cigarette system according to claim 12, wherein the locking member comprises a manipulation portion and a locking portion provided at one end of the manipulation portion, the locking portion is rotatably connected to the housing through a rotating shaft, and the locking portion is a cam.

15. The electronic cigarette system according to claim 12, wherein the charging device further comprises a flip structure disposed adjacent to the locking structure and rotatably connected to the bottom of the housing, the flip structure is configured to cover or expose the locking structure and the cleaning device when the flip structure is operated to rotate by a user.

16. The electronic cigarette system according to claim 15, wherein the flip structure comprises a rotating shaft and a cover plate rotatably connected to the housing through the rotating shaft, the cover plate is provided with a groove configured for resisting the bottom of the cleaning device and for receiving the locking member therein.

17. The electronic cigarette system according to claim 11, wherein the charging device further comprises a power supply device located in the housing, the power supply device comprises a first battery and first electrode contacts electrically connected to the first battery, the first electrode contacts are disposed in the hollow chamber.

18. The electronic cigarette system according to claim 17, wherein the smoking device further comprises an outer casing and a second battery located in the outer casing, the outer casing defines a receiving cavity configured for placing a tobacco product therein, the heating member is located in the receiving cavity and electrically connected to the second battery.

19. The electronic cigarette system according to claim 18, wherein the smoking device further comprises second electrode contacts electrically connected to the second battery, the second electrode contacts are disposed in the receiving cavity, when the smoking device is placed into the hollow chamber for being charged by the charging device, the second electrode contacts are respectively in contact with the first electrode contacts, so that the charging device charges the smoking device.

20. The electronic cigarette system according to claim 11, wherein the hollow chamber is provided at the top of the housing, the accommodation cavity is provided at the bottom of the housing, the hollow chamber has a larger size than the accommodation cavity.

* * * * *